(12) United States Patent
Smith

(10) Patent No.: US 7,634,439 B1
(45) Date of Patent: Dec. 15, 2009

(54) METHOD AND APPARATUS TO PERFORM BUY VERSUS LEASING TRANSFORMATIONAL BIDDING

(75) Inventor: Christopher J. Smith, Wexford, PA (US)

(73) Assignee: Ariba, Inc., Sunnyvale, CA (US)

( * ) Notice: Subject to any disclaimer, the term of this patent is extended or adjusted under 35 U.S.C. 154(b) by 1207 days.

(21) Appl. No.: 09/712,302

(22) Filed: Nov. 14, 2000

(51) Int. Cl.
*G06Q 40/00* (2006.01)
(52) U.S. Cl. ......................................................... 705/37
(58) Field of Classification Search ................... 705/36, 705/37, 35
See application file for complete search history.

(56) References Cited

U.S. PATENT DOCUMENTS

| | | | |
|---|---|---|---|
| 3,581,072 A | 5/1971 | Nymeyer | |
| 3,637,464 A | 1/1972 | Walsh et al. | |
| 3,863,060 A | 1/1975 | Rode et al. | |
| 4,597,045 A | 6/1986 | Kiuchi | |
| 4,674,044 A | 6/1987 | Kalmus et al. | |
| 4,789,928 A | 12/1988 | Fujisaki | |
| 4,799,156 A | 1/1989 | Shavit et al. | |
| 4,845,625 A | 7/1989 | Stannard | |
| 4,992,940 A | 2/1991 | Dworkin | |
| 5,136,501 A | 8/1992 | Silverman et al. | |
| 5,193,056 A | 3/1993 | Boes | |
| 5,243,515 A | 9/1993 | Lee | |
| 5,297,032 A | 3/1994 | Trojan et al. | |
| 5,375,055 A | 12/1994 | Togher et al. | |
| 5,394,324 A | 2/1995 | Clearwater | |
| 5,402,336 A | 3/1995 | Spiegelhoff et al. | |
| 5,606,602 A | 2/1997 | Johnson et al. | |
| 5,629,982 A | 5/1997 | Micali | |
| 5,640,569 A | 6/1997 | Miller et al. | |
| 5,664,115 A | 9/1997 | Fraser | |
| 5,684,963 A | 11/1997 | Clement | |
| 5,689,652 A | 11/1997 | Lupien et al. | |
| 5,715,402 A | 2/1998 | Popolo | |
| 5,727,165 A | 3/1998 | Ordish et al. | |
| 5,758,327 A | 5/1998 | Gardner et al. | |
| 5,758,328 A | 5/1998 | Giovannoli | |
| 5,765,138 A | 6/1998 | Aycock et al. | |
| 5,774,873 A | 6/1998 | Berent et al. | |
| 5,794,207 A * | 8/1998 | Walker et al. ................... 705/1 |

(Continued)

FOREIGN PATENT DOCUMENTS

EP  0399850 A  11/1990

(Continued)

OTHER PUBLICATIONS

Throgh Bridge Network.com (1977).*

(Continued)

*Primary Examiner*—Hani Kazimi
*Assistant Examiner*—Olabode Akintola
(74) *Attorney, Agent, or Firm*—Van Pelt, Yi & James LLP

(57) ABSTRACT

A method and apparatus to transform bids in an electronic auction is described. A first bid having a first value and a first unit of measurement is received. A second bid having a second value and a second unit of measurement is received. The first and second values are transformed to third and fourth values, respectively, having a standard unit of measurement.

29 Claims, 7 Drawing Sheets

U.S. PATENT DOCUMENTS

| | | | |
|---|---|---|---|
| 5,794,219 | A | 8/1998 | Brown |
| 5,797,127 | A | 8/1998 | Walker et al. |
| 5,799,151 | A | 8/1998 | Hoffer |
| 5,799,285 | A | 8/1998 | Klingman |
| 5,802,502 | A | 9/1998 | Gell et al. |
| 5,803,500 | A | 9/1998 | Mossberg |
| 5,809,483 | A | 9/1998 | Broka et al. |
| 5,826,244 | A | 10/1998 | Huberman |
| 5,832,496 | A | 11/1998 | Anand et al. |
| 5,835,896 | A | 11/1998 | Fisher et al. |
| 5,862,223 | A | 1/1999 | Walker et al. |
| 5,890,138 | A | 3/1999 | Godin et al. |
| 5,897,621 | A * | 4/1999 | Boesch et al. ............ 705/26 |
| 5,905,974 | A | 5/1999 | Fraser et al. |
| 5,905,975 | A | 5/1999 | Ausubel |
| 5,915,209 | A | 6/1999 | Lawrence |
| 5,966,699 | A | 10/1999 | Zandi |
| 6,014,627 | A | 1/2000 | Togher et al. |
| 6,021,398 | A | 2/2000 | Ausubel |
| 6,023,685 | A | 2/2000 | Brett et al. |
| 6,026,383 | A | 2/2000 | Ausubel |
| 6,035,287 | A | 3/2000 | Stallaert et al. |
| 6,044,363 | A | 3/2000 | Mori et al. |
| 6,047,274 | A | 4/2000 | Johnson et al. |
| 6,052,108 | A | 4/2000 | Gadd |
| 6,055,518 | A | 4/2000 | Franklin et al. |
| 6,058,379 | A | 5/2000 | Odom et al. |
| 6,061,663 | A | 5/2000 | Bloom et al. |
| 6,078,906 | A | 6/2000 | Huberman |
| 6,119,229 | A | 9/2000 | Martinez et al. |
| 6,131,087 | A | 10/2000 | Luke et al. |
| 6,134,536 | A | 10/2000 | Shephard |
| 6,151,589 | A | 11/2000 | Aggarwal et al. |
| 6,161,099 | A | 12/2000 | Harrington et al. |
| 6,178,431 | B1 | 1/2001 | Douglas |
| 6,199,050 | B1 | 3/2001 | Alaia et al. |
| 6,216,108 | B1 | 4/2001 | LeVander |
| 6,230,146 | B1 | 5/2001 | Alaia et al. |
| 6,236,972 | B1 | 5/2001 | Shkedy |
| 6,266,652 | B1 | 7/2001 | Godin et al. |
| 6,275,807 | B1 | 8/2001 | Schirripa |
| 6,285,989 | B1 * | 9/2001 | Shoham ............ 705/37 |
| 6,343,277 | B1 | 1/2002 | Gaus et al. |
| 6,366,891 | B1 | 4/2002 | Feinberg |
| 6,778,968 | B1 | 8/2004 | Gulati |
| 2001/0044769 | A1 * | 11/2001 | Chaves ............ 705/37 |
| 2002/0013631 | A1 | 1/2002 | Parunak et al. |

FOREIGN PATENT DOCUMENTS

| | | |
|---|---|---|
| JP | 409101994 A | 4/1997 |
| JP | 410078992 A | 3/1998 |
| WO | WO 92/15174 | 9/1992 |
| WO | WO 97/37315 | 10/1997 |
| WO | WO 98/34187 | 8/1998 |
| WO | WO 99/63461 | 12/1999 |

OTHER PUBLICATIONS

Gutman, Eyal, Yagil, Joseph. A Comprehensive Lease/Purchase Model, The Engineering Economist, Summer 1994, vol. 39, Iss. 4; p. 333, 22 pgs.*

Anonymous, Auto Lease Shopping Now Made Easier, Consumers' Research Magazine, Oct. 1997. vol. 80, Iss. 10; p. 21, 4pgs.*

Gutman, E. and Yagil, J., A Comprehensive Lease/Purchase Model, Summer 1994, The Engineering Economist, vol. 39, No. 4, pp. 333-354.*

Andrews, "Auctions Catch the Interest of Hobbyists and Big Business", Aug. 24, 1998.

Associated Press, "Auction on Web is Buyer's Market", Apr. 6, 1998.

"BroadVision Developing First Interactive Commerce Management System to Support Online Sales & Marketing Process; New Software Category Necessary to Interactive Network Architecture", Business Wire, p. 5150152, May 15, 1995.

Danny Cohen, "Computerized Commerce", Information Processing 89, Aug. 28-Sep. 1, 1989.

"FairMarket Launches New Self-Serve Auctions", Business Wire, p. 6161495, Jun. 16, 1998.

Jahnke, "How Bazaar", CIO Web Business Magazine, Aug. 27, 1998.

Jean-Pierre Banatre, et al., "The Design and Building of Enchere, a Distributed Electronic Marketing System" Communications of the ACM, No. 1, Jan. 29, 1986.

Lee, "Do electronic marketplaces lower the price of goods?", Communications of the PCM, v41n1 pp. 73-80, Jan. 1998.

Malone, et al., "The Logic of Electronic Markets", Harvard Business Review, No. 893II, May-Jun. 1989.

"Moai Technologies Introduces New categories of Business to Business Auction Software . . . ", Business Editors and Computer Writers, Mar. 16, 1998.

Kikuchi, et al., "Multi-Round Anonymous Auction Protocols", IEICE Trans. Inf. & Syst., vol. E82-D, No. 4, Apr. 1999.

"Online bidding software", Electronic Buyers' News, Issue 1072, p. 86, 1/6p, Aug. 25, 1997.

Sairamesh, et al., "Economic Framework for Pricing and Charging Digital Libraries", D-Lip Magazine, Feb. 1996.

"Sold! . . . To the Lowest Bidder", Computer Finance, v6, n2, Jul. 1995.

"Venture Capitalists Fund Two Massachusetts Internet Related Companies", Boston Globe, Jan. 14, 1998.

Vigoroso, "Buyers prepare for brave new world of e-commerce", Purchasing, v126, n6, pS4(1), Apr. 22, 1999.

Von der Fehr, et al., "Predatory bidding in sequential auctions", Oxford Economics Papers, v46, n3, p. 345(12), Jul. 1994.

"What you need to know to bid in FCC's narrowband auction", Washington Telecom News, v2, n26, p. 6(2), Jun. 27, 1994.

Wilder, "What's Your Bid?—FreeMarkets' real-time online bidding technology lets clients drive downcosts and improve product value", InformationWeek, Nov. 10, 1997.

Woolley, "E-muscle", Forbes, Mar. 9, 1998.

Freemarkets Online, "Bidware Manual," Jun. 9, 1988.

Freemarkets Online, "Online Industrial Market Making, An Overview of Purchasing Executives," Have not been able to locate this prior art as of Mar. 23, 2005.

WebAuction.com, "How to Play," (1998).

Auction Sales, "Live Auctions Online," Sep. 1998.

Auction Port, "Online Auction Community—New Auctions Since Sep. 2, 1998," Jul. 1998.

OnSale, "How to Play," (1998) Have not been able to locate this prior art as of Mar. 23, 2005.

u-Auction-It (1997).

Freemarkets Online, "Homepage," (1998).

Steinert-Threlkeld, "New Watchwords: Let Sellers Beware," Jun. 1, 1998.

Associated Press, "FreeMarkets Takes Auction on Internet," Feb. 23, 1998.

M. Reck, "Types of Electronic Auctions," Hochschule St. Gallen.

C. Wrigley, "Design Criteria for Electronic Market Servers," Electronic Markets, vol. 7, No. 4 (1997).

Wurman et al., "The Michigan Internet AuctionBot: a Configurable Auction Server for Human and Software Agents," Artificial Intelligence Laboratory, University of Michigan (1998).

PCT Notification of Transmittal of International Preliminary Examination Report for PCT Counterpart Application No. PCT/US00/08522 Containing International Preliminary Examination Report (Nov. 19, 2001).

"Virginia Power to Seek 1,750 MW More Through Competitive Bidding," Electric Utility Week, p. 15 (Mar. 14, 1998).

* cited by examiner

|  | Coordinator | Buyer | Supplier |
|---|---|---|---|
| Initial Contact 102 | Contact Buyer | Provide Data |  |
| RFQ 104 | Collect & Administer RFQ Data | Provide RFQ Data |  |
|  | Publish & Administer RFQ |  | Access RFQ |
|  | Manage RFQ Response |  | Respond to RFQ |
| Auction Administration 106 |  | Request Auction |  |
|  | Coordinate & Administer Auction Setup |  |  |
|  | Assist & Administer User Auction Prep |  | Prepare for Auction |
| Conduct Auction 108 | Assist & Administer Auction | Observe | Bid |
| Administer Auction Results 110 | Analyze & Administer Auction Results | View Auction Results | View Auction Results |
| Contract Administration 112 |  | Settlement | Settlement |

FIG. 2 - System Flow

Buyer's View

| Bidder | Bid Time | Bid (¢/M*Btu) |
|---|---|---|
| Sup A | 01:05:51 | 98.2 |
| Sup B | 01:06:08 | 97.4 |
| Sup D | 01:06:49 | 101.3 |
| Sup C | 01:08:10 | 96.7 |
| Sup B | 01:15:09 | 95.5 |
| Sup D | 01:17:38 | 97.2 |
| Sup B | 01:18:57 | 96.2 |
| Sup E | 01:20:03 | 97.1 |
| Sup A | 01:25:28 | 94.8 |

Fig. 6A

Supplier A's View

| Bidder | Bid Time | Bid ($/ton) |
|---|---|---|
| Sup A | 01:05:51 | 20.92 |
| Sup B | 01:06:08 | 20.00 |
| Sup D | 01:06:49 | 24.48 |
| Sup C | 01:08:10 | 19.20 |
| Sup B | 01:15:09 | 17.82 |
| Sup D | 01:17:38 | 19.77 |
| Sup B | 01:18:57 | 18.62 |
| Sup E | 01:20:03 | 19.66 |
| Sup A | 01:25:28 | 17.01 |

Fig. 6B

Supplier B's View

| Bidder | Bid Time | Bid ($/ton) |
|--------|----------|-------------|
| Sup A | 01:05:51 | 20.00 |
| Sup B | 01:06:08 | 19.01 |
| Sup D | 01:06:49 | 23.83 |
| Sup C | 01:08:10 | 18.15 |
| Sup B | 01:15:09 | 16.67 |
| Sup D | 01:17:38 | 18.77 |
| Sup B | 01:18:57 | 17.53 |
| Sup E | 01:20:03 | 18.64 |
| Sup A | 01:25:28 | 15.80 |

Fig. 6C

METHOD AND APPARATUS TO PERFORM BUY VERSUS LEASING TRANSFORMATIONAL BIDDING

REFERENCE TO RELATED APPLICATION

The present application refers to U.S. patent application Ser. No. 09/282,157, filed on Mar. 31, 1999, entitled "Method and System for Conducting Electronic Auctions With Transformation Bidding" and assigned to the assignee of the present application FreeMarkets, Inc., the entirety of which is hereby incorporated by reference into the present application.

FIELD OF THE INVENTION

The invention relates to electronic auctions in general. More particularly, the invention relates to a method and apparatus to perform buy versus lease transformational bidding in an electronic auction.

BACKGROUND OF THE INVENTION

Electronic auctions provide a convenient means to buy and sell items over a network. The bidding process helps establish a fair market value for a particular item in a relatively short period of time. Furthermore, electronic auctions create a broader potential market than traditional auctions (and many buying models in general), while simplifying the bidding process for potential buyers and sellers.

There are, however, several challenges in optimizing the bidding process for an electronic auction, particularly with respect to providing information to a buyer or seller in a manner that permits either to make a quick relative valuation between competing bids. This is even more difficult if the bids do not use a standard unit of measure or value. For example, assume that a buyer is seeking a particular car in an electronic auction (e.g., downward bidding auction). Further assume that the buyer is willing to buy or lease the car based on which provides the lowest overall price. If one potential bidder (e.g., car seller) offers a bid based on a monthly leasing payment, while another offers a bid based on a straight purchase price, the buyer would be unable to compare bids to determine which is the most cost effective. If the potential bidders, however, were forced to submit bids in terms of only one dimension (e.g., leasing payment or straight purchase price), additional problems accrue. The problem of converting a bid to the preferred dimension would be time consuming and, moreover, potentially inaccurate given the various financial assumptions each potential bidder would be forced to make.

Some background information regarding traditional auctions in general and electronic auctions in particular may help illustrate the scope and impact of this type of problem. Procurement of supplies has traditionally involved high transaction costs, especially information search costs. The introduction of electronic commerce has introduced new methods of procurement that lower costs associated with procurement. Online procurement, or business-to-business electronic commerce, matches buyers and suppliers so that transactions can take place electronically. There are three models for online procurement: catalog, buyer-bidding auction, and supplier-bidding auction.

The "catalog" model of online procurement was the first to be developed. The first electronic catalogs were developed by suppliers to help customers obtain information about products and order supplies electronically. These first electronic catalogs were single-source; i.e., they only allowed customers to obtain information and products from that supplier.

Customers, however, are not typically satisfied with being "locked in" to one supplier. Rather, they wanted to be able to compare a number of competing products to be sure of getting the product features they wanted, at the best price. So suppliers with single-source electronic catalogs started to include competitors' products on their systems. An example of this is American's SABRE system, which includes offerings from competing suppliers (airlines), thereby further reducing information search costs. By offering competing products, the electronic catalog that offers competitor's products becomes an "electronic market".

Many of these systems are biased towards the supplier offering the electronic market. Procurement costs can be further lowered with an unbiased electronic market that promotes competition.

For standard products and services, the need to have an unbiased market has been met for many industries by third party "market makers." For example, Inventory Locator Services has compiled a database that lists all airplane parts suppliers that have a certain item in stock. Buyers dial into the database to get information on the parts they need. Here, it is a third party, Inventory Locator Service, not a supplier, creating the unbiased electronic market.

The electronic catalog model of electronic commerce involves one buyer and one supplier at a time. When many buyers compete for the right to buy from one supplier, a buyer-bidding auction model is created. A noteworthy example of the buyer-bidding auction model is that operated by PriceLine.com and described in U.S. Pat. No. 5,794,207 issued to Walker et al. In this system, potential buyers compete for airline tickets by submitting a bid for an airline ticket on the PriceLine website, and airlines can choose to accept a bid, thereby committing the buyer to buy the ticket.

The catalog and buyer-bidding auction types of electronic markets, however, are not suitable for some situations. If the required product is custom made for the buyer, it is not possible for suppliers to publish a set price in advance for a catalog market. Likewise, it is not possible for buyers to specify all of the details of the product they want to purchase in a buyer-bidding auction. Traditionally, when a company requires a custom industrial product, procurement is made by a buyer for the company who searches for a potential supplier and acquires custom-tailored price quotes from a supplier for the needed custom product. The search is slow and somewhat random because it usually relies heavily on personal relationships. The costs associated with locating vendors, comparing their products, negotiating, and paperwork become big factors in a purchase decision. The cost of switching suppliers is very large, which means that the quoted price is probably not the lowest fair price and it is hard for a new supplier to enter the market.

As an alternative, buyers use auctions to save money. The assignee of the present application developed a system wherein suppliers downwardly bid against one another to achieve the lowest market price in a supplier-bidding auction.

In a supplier-bidding auction, bid prices typically start high and move downward in reverse-auction format as suppliers interact to establish a closing price. The auction marketplace is one-sided, i.e., one buyer and many potential suppliers. Typically, the products being purchased are components or materials. "Components" typically mean fabricated tangible pieces or parts that become part of assemblies of durable products. Example components include gears, bearings, appliance shelves, or door handles. "Materials" typically mean bulk quantities of raw materials that are further transformed into product. Example materials include corn syrup or sheet steel.

Industrial buyers do not typically purchase one component at a time. Rather, they purchase whole families of similar components. At times, components are strongly related to one another. As an example, a buyer might purchase a given plastic knob in two different colors, or might purchase a nameplate in four different languages. These parts are so similar that by definition they must be purchased from the same supplier—all of the knobs are made using the same mold. These items are therefore grouped into a single lot. Suppliers in industrial auctions must provide unit price quotes for all line items in a lot.

A process for a supplier-bidding auction is described below with reference to FIGS. 1 and 2. FIG. 1 illustrates the functional elements and entities in a supplier-bidding auction, while FIG. 2 is a process diagram that identifies the tasks performed by each of the involved entities.

The supplier-bidding auction model requires that a buyer 10 define a bidding product or service. An auction coordinator 20 works with the buyer 10 to prepare for and conduct an auction and to define the potentially new supply relationships resulting from the auction.

As shown in FIG. 2, in the Initial Contact phase 102 of the auction process, the coordinator 20 contacts the buyer 10, and the buyer 10 provides data to the coordinator 20. The coordinator 20 prepares a specification 50 for each desired product or part 52. Once the product 52 is defined, potential suppliers 30 for the product are identified. The coordinator 20 and buyer 10 work together to compile this list of potential suppliers from suppliers already known to the buyer 10 as well as suppliers recommended by the coordinator 20.

The buyer 10 makes a decision regarding which potential suppliers 30 will receive invitations to the upcoming Auction. Suppliers 30 that accept Auction invitations are then sent notices regarding the upcoming Auction, as well as client software to install in preparation of participating in the Auction.

In the RFQ phase 104, the coordinator 20 works with the buyer 10 to prepare a Request for Quotation ("RFQ") 54. The coordinator 20 collects and maintains the RFQ data provided by buyer 10, and then publishes the RFQ 54, and manages the published RFQ 54. The RFQ 54 includes specifications 50 for all of the parts 52 covered by the RFQ 54. In the RFQ 54, buyer 10 aggregates similar parts or commodity line items into job "lots." These lots allow suppliers 30 to bid on that portion of the business for which they are best suited.

During the auction 56, bids 58 will be taken against individual lots (and their constituent parts 52) within RFQ 54. While suppliers 30 must submit actual unit prices for all line items, the competition in an Auction is based on the aggregate value bid for lots. The aggregate value bid for a lot depends upon the level and mix of line item bids and the quantity for each line item. Therefore, suppliers 30 submit bids at the line item level, but compete on the lot level.

In the Auction Administration phase 106, coordinator 20 coordinates the Auction and administers the Auction setup and preparation. The coordinator 20 sends a RFQ 54 to each participating supplier 30, and assists participating suppliers 30 with preparation for the Auction.

In the Auction phase 108, suppliers 30 submit bids 58 on the lots and monitor the progress of the bidding by the participating suppliers 30. The coordinator 20 assists, observes, and administers the Auction.

When the bidding period is over, the auction enters the Auction Results Administration phase 110. In this phase, coordinator 20 analyzes and administers the Auction results, which are viewed by buyer 10. The buyer 10 begins to conduct a final qualification of the low bidding supplier(s). The buyer 10 retains the right not to award business to a low bidding supplier 30 based on final qualification results or other business concerns.

In the ensuing Contract Administration phase 112, the coordinator 20 facilitates settlements 60 awarded by the buyer 10 to suppliers 30. Contracts 52 are then drawn up between buyer 10 and suppliers 30.

The Auction is conducted electronically between potential suppliers 30 at their respective remote sites and the coordinator 20 at its site. As shown in FIGS. 3 and 4, information is conveyed between the coordinator 20 and the suppliers 30 via a communications medium such as a network service provider accessed by the participants through, for example, dial-up telephone connections using modems, or direct network connections. A computer software application is used to manage the Auction. The software application has two components: a client component 31 and a server component 23. The client component 31 operates on a computer at the site of each of the potential suppliers 30. Suppliers 30 make bids during the auction using the client component. The bids are sent via the network service provider to the site of the coordinator, where it is received by the server component 23 of the software application. The client component 31 includes software used to make a connection through telephone lines or the Internet to the server component 23. Bids 58 are submitted over this connection and updates are sent to the connected suppliers.

Bids 58 can only be submitted using the client component 31 of the application—this ensures that buyers do not circumvent the bidding process, and that only invited suppliers participate in the bidding. Typically, bidders can see their bids and bids placed by other suppliers for each lot on the client component 31. When a bidder submits a bid, that bid is sent to the server component 23 and evaluated to determine whether the bid is from an authorized bidder, and whether the bid has exceeded a pre-determined maximum acceptable price. Bids placed by a supplier are broadcasted to all connected bidders thereby enabling every participating bidder to see quickly the change in market conditions and begin planning their competitive responses.

Traditional online auctions focus on price as the sole variable upon which the online competition is based. Price is the sole bidding parameter that is provided by the bidders and hence is the sole parameter upon which a selection process is made. Relative valuations between different bid prices are quick and intuitive.

In some business-to-business situations, however, a plurality of parameters is considered in combination with the bidder's price proposal. In these situations, the buyer traditionally negotiates with each bidder independently because multi-parameter bids cannot be readily compared. As a simplified example, consider coal. Coal varies in its thermal content (i.e., BTU content) as well as in its sulfur content. Buyers would be willing to pay more, all things being equal, for higher thermal content or lower sulfur content. Sellers cannot readily change the composition of their coal. Therefore, it has traditionally been difficult to conduct an auction for coal, because not all coal is equal.

As discussed above, a similar problem exists with respect to comparing total costs associated with leasing versus buying programs. Whenever a buyer seeks to acquire use of a new means of transportation, such as a vehicle, essentially two options are made available to the buyer. The first option is a straight purchase of the vehicle, taking into consideration the purchase price, loan interest, taxes, delivery costs, maintenance programs, extended warranties and so forth. The second option is a lease contract, taking into consideration monthly leasing payments, length of lease, residual value of the vehicle at the end of the lease period, front end payments, back end or termination payments, mileage, tax shields, corporate cost of debt or cost of capital, and so forth. Accordingly, there are multiple bidding parameters associated with leasing programs and buying programs that make it difficult to compare the two in the electronic auction environment.

In view of the foregoing, it can be appreciated that a substantial need exists for a method and apparatus that solves the above-discussed problems.

SUMMARY OF THE INVENTION

The embodiments of the invention include a method and apparatus to transform bids in an electronic auction. In one embodiment of the invention, a first bid having a first value and a first unit of measurement is received. A second bid having a second value and a second unit of measurement is received. The first and second values are transformed to third and fourth values, respectively, having a standard unit of measurement.

With these and other advantages and features of the invention that will become hereinafter apparent, the nature of the invention may be more clearly understood by reference to the following detailed description of the invention, the appended claims and to the several drawings attached herein.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings:

FIG. 2 illustrates the tasks performed by the entities involved in an auction process;

FIGS. 6A-6C illustrate bid history charts based upon buyer and supplier viewpoints.

DETAILED DESCRIPTION

Figure 1:
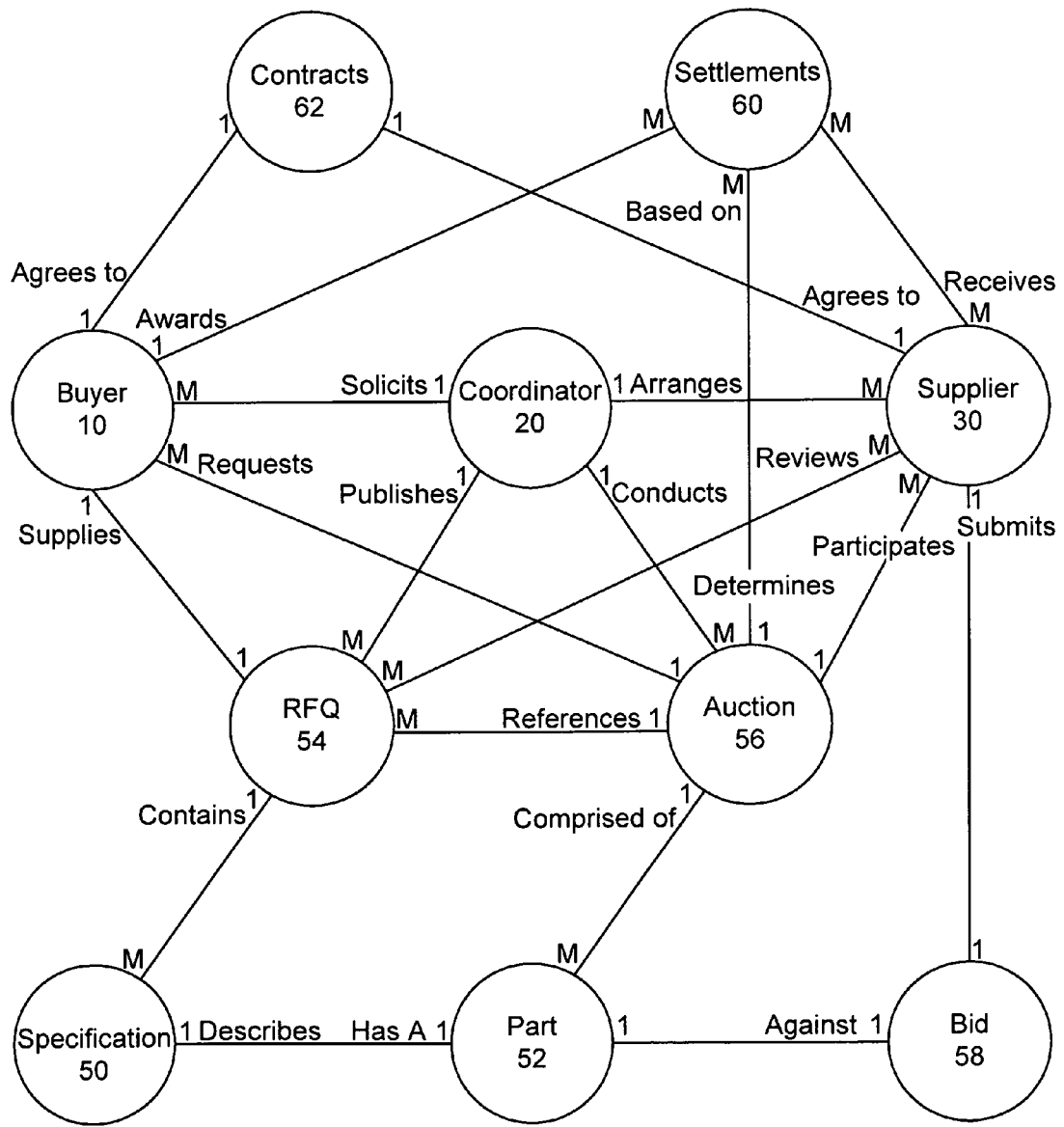
FIG. 1 illustrates the elements and entities involved in an auction process.
Figure 3:
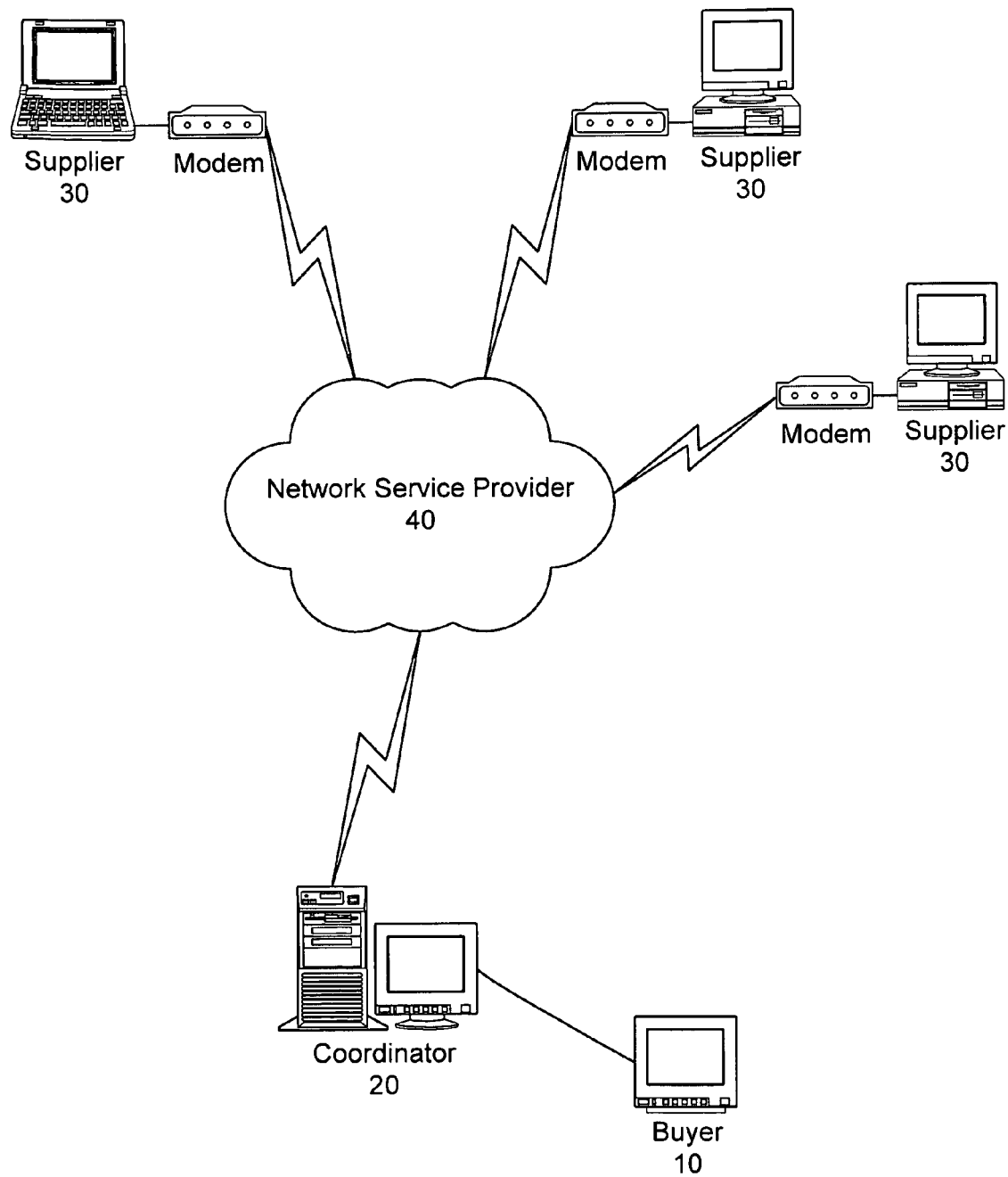
FIG. 3 illustrates the communications links between the coordinator and the potential suppliers in an auction.

The embodiments of the invention comprise a method and apparatus to create a competitive auction for goods or services that traditionally could not take advantage of natural auction dynamics. Competition is fostered through the real-time transformation of multi-parameter bids into comparable units of measure. The transformation process is an expression of the relative impact (or weighting) of each of the individual bidding parameters. In this manner, the transformation process enables an apples-to-apples comparison of multi-parameter bids.

The present invention also enables bidders to view an ongoing auction in their own context. In other words, bidders see current market conditions in relation to their own product parameters. This context viewing feature is enabled through the de-transformation of bidder market feedback into individual bidder contexts. Through the de-transformation process, each bidder can simultaneously view a relative comparison of bids in their own context.

One embodiment of the invention includes a method and apparatus to transform bids in an electronic auction. A bidder submits a bid for a lot (e.g., a vehicle) in the form of a periodic leasing payment (e.g., monthly). The leasing payment is transformed using a transformation factor. The transformation factor is calculated taking into account various leasing parameters, such as tax rate, depreciation model, book value life, cost of debt, cost of capital, risk factors based on different leasing plans, inception costs, exit costs, tax shield, lease lengths, and so forth. The result of the first transformation is a total present value or cost of the lease. The same or another bidder submits a bid for the lot (e.g., a vehicle) in the form of a vehicle purchase price. The purchase price is transformed using another transformation factor. The transformation factor is calculated taking into account various purchase price parameters, such as tax rate, depreciation model, book value life, cost of debt, cost of capital, inception costs, exit costs and so forth. The result of the second transformation is a total present value or cost of an outright purchase of the vehicle. By transforming the lease payments and purchase price into a present value, the buyer can now make quick and intuitive relative valuations between the different bids, which is one of the primary strengths of electronic auctions. In other words, the transformation process enables an immediate apples-to-apples comparison of leasing versus buying bids for a lot.

The leasing versus buying transformation process provides several advantages in addition to those described above. For example, by restricting the bid format to individual bids for leases or for a purchase, the purchaser may miss out on a market preference for one or the other based upon availability of assets. The embodiments of the invention minimize this problem. In addition, as the decision to lease or buy is in fact one decision for the purchaser, the direct comparison of the two in an interactive event assures that the suppliers understand that their offerings are not mutually exclusive and enables them to respond to substitution options in the bidding. In another example, by directly applying the financial criteria which the buyer would use in making its decision to elect for a lease or a purchase, the timing to make a decision is greatly reduced as the multiple functions within the buying organization no longer have to make individual assessments on supplier offerings.

It is worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Reference will now be made in detail to the preferred embodiments of the present invention, examples of which are illustrated in the accompanying drawings. The present invention described below extends the operation of the inventive auction system and method described in greater detail in co-pending application Ser. No. 09/252,790, entitled "Method and System for Conducting Electronic Auctions," filed Feb. 19, 1999, the disclosure of which is hereby expressly incorporated in the present application.

Traditional online auctions focus on price as the sole variable upon which the online competition is based. Price is the sole bidding parameter that is provided by the bidders and hence is the sole parameter upon which a selection process is made. Relative valuations between different bid prices is quick and intuitive.

In many types of business transactions, price is not the sole parameter upon which a decision is made. For example, in the negotiations for a supply contract, a buyer will compare various proposals not only on the basis of price but also on the basis of the non-price characteristics of non-standard goods, the location of the supplier, the reputation of the supplier, etc. In a typical business-to-business situation, a plurality of parameters is considered in combination with the supplier's price proposal.

In these situations, purchasers traditionally negotiate with each supplier independently because multi-parameter bids cannot be readily compared. Actual comparisons by the purchaser are based on a combination of subjective and objective weighting functions. Bidders do not typically have access to information on the buyer-defined weighting functions. At most, bidders would be selectively informed (at their disadvantage) of aspects of other competing bids. The limited communication of information between bidders limits the potential of true competition between the bidders. The absence of competition lowers the likelihood that the bidders will approach their true walk-away bid. Further, the manual weighting process is time consuming and subject to inconsistency from one application to the next.

The present invention is designed to create a market of competition in business transactions that traditionally could not take advantage of natural auction dynamics. Competition is fostered through the transformation of multi-parameter bids into comparable units of measure. This transformation process enables an apples-to-apples comparison of disparate bids. The following description of the features of the present invention is presented in the context of downward-based online industrial auctions. As would be appreciated by one of ordinary skill in the relevant art, these inventive features could also be applied in the context of upward-based online auctions as well.

As noted, multi-parameter bids cannot be readily compared. Comparison of multi-parameter bids cannot be realized unless the relative impact (or weighting) of each of the individual bidding parameters is known. Intuition that is based on subjective assessments (or valuations) of multiple bid parameters cannot create an efficient market because subjective assessments are inconsistently applied and applied after lengthy delays. Multi-parameter bid transformation enables true auction competition because it forces a greater degree of objectivity into the valuation process and is accomplished in real-time, allowing an auction dynamic to occur. Comparison of bids can therefore be accomplished in accordance with one or more comparative bid parameters.

Figure 5:
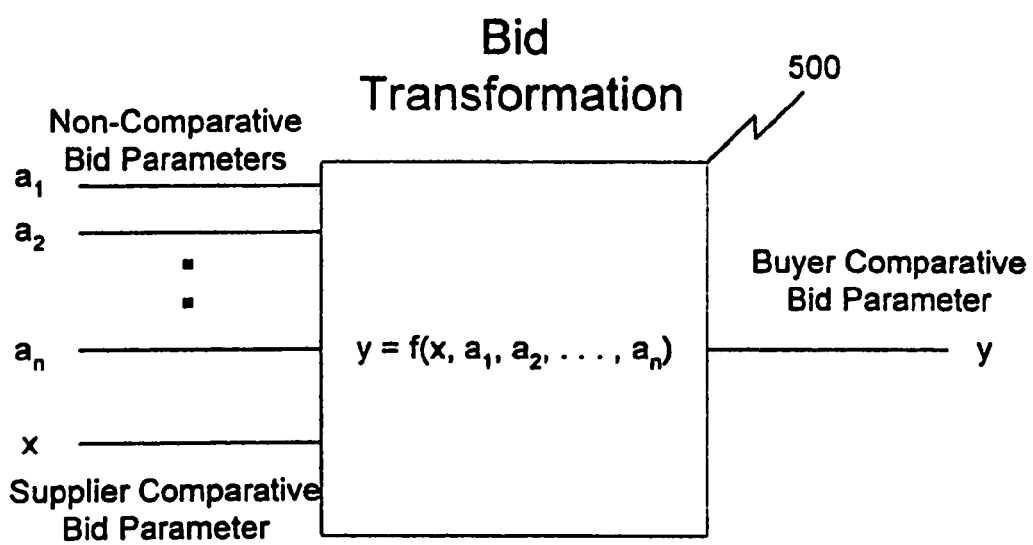
FIG. 5 illustrates a bid transformation function.

A generic transformation mechanism is illustrated in FIG. 5. As illustrated, bid transformation 500 represents a function (f) that is operative on input variables (x) and ($a_1 \ldots a_n$). Input variables ($a_1 \ldots a_n$) represent non-comparative bid parameters, while input variable (x) represents a supplier comparative bid parameter (e.g., price). The output of bid transformation 500 is the buyer comparative bid parameter (y).

In one embodiment, the bid transformation function (f) is a linear or non-linear analytic function that is calculated in real-time. In another embodiment, the bid transformation function (f) is a linear or non-linear function that is implemented via lookup tables. In yet another embodiment, the transformation function is a combination of an analytic linear function, analytic non-linear function, and table lookup function. The combination can be nested more than one layer deep.

In the generic description of the transformation process in FIG. 5, two types of comparative bid parameters exist. A buyer comparative bid parameter (y) refers to a parameter, resulting from the transformation process, upon which the buyer will compare competing bids. A supplier comparative bid parameter (x), on the other hand, refers to an input to the transformation function (f). As will be described in greater detail below, the supplier comparative bid parameter can be used by a supplier to compare competing bids in the supplier's context. In some applications, the supplier comparative bid parameter is not used because all parties may be allowed to view the auction in the buyer's context.

As noted, non-comparative bid parameters are also used as inputs to the transformation process. Unlike supplier comparative bid parameters, non-comparative bid parameters (e.g., non-price parameters) are not directly used to compare competing bids.

In this transformation framework, a supplier comparative bid parameter value can be modified by the transformation process based upon non-comparative bid parameter values to yield a buyer comparative bid parameter value. This scenario is discussed below in the context of the coal market.

Alternatively, the transformation process can use multiple non-comparative bid parameters to create a buyer comparative bid parameter. In this case, no supplier comparative bid parameters are used to create supplier specific views. All parties view the competition in the same context. An example of this scenario is net present value (NPV) bidding, where parameters specifying multi-year contracts are converted into a total NPV bid. The total NPV bid represents a sum of a series of payments over multiple contract years, which are discounted to a present value using a predefined discount rate structure. NPV bidding is described in co-pending U.S. application Ser. No. 09/282,156, entitled "Method and System for Conducting Electronic Auctions with Net Present Value Bidding", the disclosure of which is hereby expressly incorporated in the present application (the "'156 application").

Where a single buyer comparative bid parameter (e.g., price) is output by the transformation process, competition between bids is based on the relative magnitude of the values of the buyer comparative bid parameter associated with each of the bidders. This relative magnitude of the comparative bid parameters can be illustrated on a one-dimensional plot. Where multiple buyer comparative bid parameters are output by the transformation process, competition between bids can be compared using a multiple dimensional plot. In most cases, the use of a single buyer comparative bid parameter is advantageous because it provides the simplest means for all parties to unambiguously determine a relative ranking of bids.

The concepts and features of the present invention are now illustrated in the context of a particular application within the coal market. Coal purchase decisions are based on a variety of factors relating to the characteristics of the coal as well as the characteristics of the buyer's needs and physical facilities. Characteristics of the coal include factors such as thermal content (BTU/lb), percentage sulfur, percentage ash, percentage water/moisture, hardness, etc. Relevant characteristics of the buyer include the time frame of required delivery, types of power generation units, etc.

During negotiations with multiple coal suppliers, each of the relevant factors are evaluated in combination to determine the relative attractiveness of each of the received bids. The evaluation process is often a combination of subjective judgment, based on instinct and experience, and hard quantitative analysis. As one can readily appreciate, this evaluation process, although typical, is time consuming and adds great uncertainty for the suppliers.

Time delays are inherent since each supplier is negotiated with independently. Suppliers face great uncertainty in this process because the internal subjective/quantitative metrics used by the buyer in the evaluation process are inconsistently applied. Negotiation tactics dictate that the subjective/quantitative metrics used by the buyer are not provided to the suppliers. This confidential information gives the buyer leverage in altering the supplier's perception of the relative attractiveness of the submitted bid. During the negotiation process, suppliers may be selectively informed (at their disadvantage) of aspects of the decision making process.

Limited communication of information to the suppliers limits the potential of true competition between the suppliers. The absence of competition lowers the likelihood that the suppliers will approach their best offer.

The present invention creates true competition between suppliers in an auction system that enables comparison of truly disparate bids. While traditional auctions focus on price as the sole variable of online competition, the present invention also factors in non-price variables into the bid evaluation and award process.

In the coal market example, the buyer may be ultimately interested in the price per unit energy produced when the coal is processed through their power generation unit. As noted, all coal is not created equal. The characteristics of the particular coal being offered by a supplier are unique to the supplier. Moreover, different power generation units will produce different quantities of energy from identical coal, due to engineering differences built into the power generation units.

Bids for coal are typically submitted on a price per physical measure of weight or volume (e.g., $/ton) basis. The raw $/ton bids of the participating suppliers cannot be readily compared to each other due to the underlying characteristics of the coal. A mechanism is therefore required to transform each of the bids into a context that enables an apples-to-apples comparison such that the buyer can choose the most competitive bid. In the coal market example, the transformation process is designed to transform the $/ton bids for unique lots of coal into standardized units of value to the buyer (e.g., price-per-unit-of-energy bids such as ¢/Million BTU). After all of the $/ton bids are transformed into ¢/Million BTU bids, the buyer can readily identify the market leading bids.

It should be noted that the standardized units of value to the buyer can include various forms, such as a cost per unit of thermal content from the coal, a cost per unit of electrical energy output from a generation facility burning the coal, the revenue from selling electrical energy output of a generation facility burning the coal, a measure of profit contribution from selling electrical energy output of a generation facility burning the coal, a measure of the net present value of a decision to accept the coal, wherein the decision is modeled to take into account the overall improvement in the buyer's economic condition, including revenue generated, costs avoided, risks mitigated, or asset valuation improved.

The latter example is a function that implements the notion that accepting a certain coal bid might have a portfolio effect on the buyer's overall situation, or might change the economics of a certain project. For example, a buyer might be considering whether to build a new power plant, and since coal is a high percentage of the life cycle cost of the power plant, changes in the price of coal offered to the buyer might change the overall value of the plant.

The transformation function used in the coal market has been modeled as a linear transformation. In this linear transformation, a suppliers raw $/ton bid is modified using multiplicative and additive adjustments (or factors) to yield a ¢/Million BTU bid. Each of the multiplicative and additive factors are based upon characteristics (e.g., coal characteristics, delivery specifications, etc.) of a submitted bid.

It should be noted that the characteristics of a supplier's coal might have been identified prior to the start of the auction. In this case, multiplicative and additive factors are determined prior to the start of the auction and stored in memory by the server component. During the auction process, the multiplicative and additive factors are retrieved from memory and used to transform the raw $/ton bid into a ¢/Million BTU bid. In one embodiment, a multiplicative and/or additive factor is stored by the server component for each of the characteristics of the supplier's coal. In an alternative embodiment, a single multiplicative factor and a single additive factor, representative of the cumulative effect of the characteristics of the coal in the linear transformation, is stored.

In another scenario, the characteristics of a supplier's coal are provided as part of a supplier's first submitted bid along with the raw $/ton bid to the server component. In this case, the characteristics of the supplier's coal (i.e., BTU/lb, % sulfur, % ash, % water, etc.) would be fed by the server component into the transformation function to determine, in real-time, the buyer comparative bid parameter that is the result of the transformation function. The server component may store the net result of the transformation function factors in memory for retrieval in the transformation of future bids by that supplier.

The transformation process in the coal market example can be generically characterized by the transformation process illustrated in FIG. 5. In the coal market example, the output of the transformation process is the ¢/Million BTU parameter. The ¢/Million BTU parameter represents the basis upon which a buyer will compare the bids submitted by the participating suppliers. Accordingly, the ¢/Million BTU parameter represents a buyer comparative bid parameter.

In the coal example, the transformation process takes as inputs both comparative and non-comparative bid parameters. The non-comparative bid parameters represent the characteristics of the coal (i.e., BTU/lb, % sulfur, % ash, % water, delivery time, etc.) and the characteristics of the buyer. The $/ton price parameter represents a supplier comparative bid parameter. In combination, the comparative and non-comparative bid parameters are operated upon by the transformation function (f) to yield the buyer comparative bid parameter value in ¢/Million BTU.

At this point, it should be noted that the supplier comparative bid parameter ($/ton) is significant because it enables the supplier to view a relative comparison of bids in the supplier's individual context. This feature of the present invention will be described in greater detail below in the discussion of the detransformation and feedback parts of the auction process.

After each of the submitted bids have been transformed into the buyer comparative bid parameter ¢/Million BTU, an "apples-to-apples" comparison can be performed. The "apples-to-apples" comparison can be effected in any of a variety of ways including the bid history chart of FIG. 6A. The bid history chart of FIG. 6A illustrates a relative ranking of transformed received bids in ¢/Million BTU.

Having received a bid from a participating supplier, the auction server must then broadcast market feedback to the other participating suppliers. This broadcast function creates a real-time online competition between suppliers who are able to view the activities of their competitors and plan their corresponding response strategy.

In the coal market, the specific factors used in the transformation function are often confidential to the buyer. Accordingly, the buyer desires to prevent the suppliers from gaining insight into aspects of the transformation function that quantifies the buyer's weighting of various parameters associated with a supplier's bid. For this reason, the auction server does not feedback the transformed bids to the participating suppliers. Rather, the auction server broadcasts bids that have been detransformed from the buyer comparative bid parameter (i.e., ¢/Million BTU) into the context (i.e., $/ton) of the individual suppliers.

The $/ton bid for a supplier is referred to as the supplier comparative bid parameter. As illustrated in FIG. 5, the supplier comparative bid parameter is one of the inputs into the transformation function (f). The supplier comparative bid parameter is significant because it enables the supplier to view the auction competition in his own context. In other words, a supplier can view all competing bids as if all suppliers were offering the same type of coal for sale. In this manner, a supplier can view the competitive auction landscape without receiving any information concerning the transformation function that has been defined by the buyer.

In the coal example, the transformation process is modeled as a linear function, having at least one multiplicative factor and/or at least one additive factor. This transformation can be represented by the well known algebraic function $y=mx+b$, where m is the multiplicative factor, b is the additive factor, x is the supplier comparative bid parameter, and y is the buyer comparative bid parameter.

Bids viewed in the buyer's context have been converted into the buyer comparative bid parameter (i.e., ¢/Million BTU). On the supplier side, each of the bids submitted from other participating suppliers are detransformed from the buyer comparative bid parameter into the supplier comparative bid parameter. This detransformation is accomplished by solving the formula for x to yield the formula $x=(y-b)/m$. In this detransformation process, ¢/Million BTU bid values that are to be broadcast to Supplier A are converted to $/ton bid values using the multiplicative and/or additive factors for Supplier A.

After the client component at Supplier A receives the detransformed bid values, Supplier A is then able to view a relative comparison of the bids in his own context. This relative comparison corresponds to the relative comparison of the bids in the buyer context. FIG. 6B illustrates a bid history chart in the context of Supplier A. In this example, it is assumed that Supplier A's multiplicative and additive factors are, $m=0.87$ and $b=80$, respectively.

As FIG. 6B demonstrates, Supplier A can view the competitive climate of the auction without having access to any of the details of the transformation function (f) implemented by the buyer. From Supplier A's perspective, all other suppliers are bidding the same type of coal. Competition is therefore perceived as being based on the $/ton price, not the ¢/Million BTU price. If Supplier A decides to beat the market leading bid, Supplier A would simply reduce his $/ton bid and submit the new bid (e.g., bid of $17.01/ton bid at 01:25:28) to the auction server. The new $17.01/ton bid would then be transformed into a 94.8 ¢/Million BTU bid, i.e., $0.87*17.01+80=94.8$ ¢/Million BTU, using the multiplicative and additive adjustments for Supplier A.

In a similar manner, Supplier B can also view the competitive climate of the auction without having access to any of the details of the transformation function implemented by the buyer. Supplier B's view is illustrated in FIG. 6C. In this example, it is assumed that Supplier B's multiplicative and additive factors are, $m=0.81$ and $b=82$, respectively. In Supplier B's view, Supplier A's new bid of $17.01/ton (or 94.8 ¢/Million BTU) at 01:25:28 is fed back to Supplier B as a $15.80/ton bid, i.e., $(94.8-82)/0.81=\$15.80$/ton, using Supplier B's multiplicative and additive parameters.

In combination, FIGS. 6A-6C illustrate a feature of the present invention that enables each supplier to view the auction in his own context. These buyer-specific and supplier-specific contexts enable the system to create a coal auction market without revealing confidential information to the suppliers. The creation of an online electronic auction greatly benefits the buyer by allowing the buyer to get true market prices. The online electronic auction can easily produce hundreds of bids in a span of a few hours. This is in sharp contrast to traditional coal market mechanisms that relied upon the simultaneous occurrence of independent negotiations over a course of weeks.

It should be noted that a supplier may simultaneously offer a plurality of products of differing technical specifications. In this case, the transformation function must treat these offerings separately. Each offering has its own context, and an array of detransformed bid values unique to that offering.

It should be noted that a supplier could also modify a bid by changing a non-price parameter. For example, instead of changing the $/ton bid, a supplier could choose to change a particular characteristic (e.g., % ash, % sulfur, etc.) of the coal that is being bid. This new type of coal can be based upon a mixture or blend of different types of coal within the supplier's control. By adjusting the characteristics of the coal, the supplier is effectively adjusting the multiplicative factor and/or additive factor that defines his transformation function. For this reason, the new blend of coal would define a new context for that supplier. The supplier would then have the option of amending an existing offering or creating a second offering. If the supplier creates a new offering, viewing that new blended bid within the context of the auction market would require a second bid history chart. In effect, the supplier has entered two horses into the race. This has the additional benefit to suppliers of allowing them to balance their own supply with market demand in the most beneficial manner.

Another example of transformation bidding is multi-currency bidding. Multi-currency bidding is an auction format wherein the buyer views all submitted bids in a base currency (e.g., U.S. dollars), while each of the suppliers view all submitted bids in a local currency (e.g., Japanese Yen, Swiss Francs, etc.). Multi-currency bidding is described in co-pending U.S. application Ser. No. 09/282,158, entitled "Method and System for Conducting Electronic Auctions with Multi-Currency Bidding,", the disclosure of which is hereby expressly incorporated in the present application.

In the multi-currency bidding example, the local currency represents a supplier comparative bid parameter. The exchange rate between the local currency and the base currency represents a non-comparative bid parameter. It should be noted that in the multi-currency example, the non-comparative bid parameter is provided by the buyer or independent party instead of the supplier. In effect, the supplier's bid is a single parameter (i.e., local currency price) to be transformed into a buyer comparative bid parameter (i.e., base currency price).

In a similar fashion as the coal market example, each of the suppliers can view the auction in their own context (or local currency). Here, confidentiality of the transformation process is not the driver for separate supplier views. Rather, separate supplier views are desired because of user unfamiliarity of viewing prices in a foreign currency. Detransformation is represented by the conversion of base currency bids into the relevant local currency.

In the multi-currency bidding application, the exchange rates are not confidential. Accordingly, the transformation/detransformation process can be performed at the client component and/or the auction server component. For example, assume that Supplier A is bidding in Japanese Yen, Supplier B is bidding in Swiss Francs, and the buyer is viewing the auction in U.S. dollars. The client component of Supplier A can submit the bid in Yen or in U.S. dollars. If the bid is to be submitted in U.S. dollars, the client component is configured to convert the bid to dollars prior to submission to the auction server.

On the receiving end, the client component of Supplier B can receive a bid price submitted by Supplier A in Yen, U.S. dollars or Swiss Francs. If the auction server sends a bid submitted by Supplier A in yen to Supplier B, the auction server is performing the detransformation process (i.e., currency exchange to Yen). In this case, no currency conversion is required by the client component of Supplier B. Alternatively, the client component of Supplier B can be configured to perform the currency exchange of Supplier A's bid. This currency exchange can be based upon the receipt of a bid in the base currency (U.S. dollars) or Supplier A's local currency (Yen). In this case, the currency conversion is performed by the client component of Supplier B prior to the display of Supplier A's bid to Supplier B.

In other embodiments, multi-parameter price equalization bidding can be used to solve other problems when price alone cannot adequately discriminate between a plurality of offerings. One example concerns transportation costs. Because buyers often control inbound transportation and have favorable contract rates, the transformation function might be configured to translate bids of FOB supplier pricing into bids of FOB buyer. Another example concerns penalty factors buyers might apply. Some suppliers may be assessed penalties due to additional cost factors the buyer might have to assume. For example, an overseas supplier might be automatically penalized a given percent or fixed amount to cover the extra costs of travel, input/export duties, and international banking fees.

In other embodiments, the transformation function that converts the supplier comparative bid parameter into buyer comparative bid parameters might be non-linear. This non-linear transformation may be implemented in a variety of ways. In one embodiment, the algebraic transformation function (f) is defined as a non-linear function rather than a linear function. The form of this function might be a polynomial such as $y=nx^2+mx+b$. It might also use logarithms or power functions.

In another embodiment, the transformation function (f) uses lookup tables. A lookup table is a form of transformation function whereby a given input value or range of input values is translated into a given output value. The lookup table is constructed in advance in such a way that all possible values of input are translated into an acceptable value of output.

Non-linear transformation functions can serve to provide additional emphasis to certain parameters. For example, a product's value may rise at a faster rate as a certain quality factor approaches perfection. The value of a perfect diamond, for example, can be many times higher than the value of a slightly imperfect diamond. However, as the level of imperfection rises, the drop off in value slows. This is a non-linear transformation from an engineering attribute into value.

Lookup tables can be used to simplify preparation. For example, consider the problem of translating FOB supplier prices into FOB buyer prices, including transportation costs between a supplier and a buyer. In theory, a linear transportation function might be used to apply an additive factor such as "cents per unit per mile shipped." In practice, it can be far simpler to prepare an auction using a rule such as "within 100 miles shipping is $0.01 per unit, between 101-250 miles shipping is $0.03 per unit, and above 250 miles shipping is $0.05 per unit." In this case, a lookup table provides an easier implementation. In this framework, supplier A located 60 miles from the buyer would be assessed $0.01 per unit for shipping, while supplier B located 105 miles from the buyer and supplier C located 230 miles away would both be assessed $0.03 per unit.

It should be noted that a combination of linear, non-linear, and lookup table transformations might apply to any given auction. For example, a linear transformation function might be used, where various additive transformation factors are themselves the output values from a lookup table, another linear function, or a non-linear function. In other words, the transformation functions may be nested to include more than one type of calculation in any given embodiment.

Generally, where the transformation function is non-confidential, the transformation process can be implemented individually or jointly by the auction server component and the individual client components. The joint implementation can be designed in various ways to achieve the same goal, the support of individual buyer and supplier views.

As noted above, the transformation process can also be used in a context where only a single view of the auction is available. Here, the buyer and each of the participating suppliers each view the auction based on the buyer comparative bid parameter (e.g., NPV bidding).

Yet another example of transformational bidding is lease versus buy bidding. In addition to the products described above, the transformation process can be applied to services and financial vehicles as well. For example, a potential buyer in the market for a vehicle or other form of asset/capital investment often has a choice between an outright purchase of the vehicle or to lease the vehicle. Each decision has multiple parameters that effect the total cost of the transaction. For example, the total costs involved in the purchase of a car go beyond the purchase price negotiated between the buyer and seller, but also includes finance terms, interest rates, length of financing, taxes, depreciation methods, delivery costs, manufacturer rebates, dealer rebates and so forth. Each of these parameters affects the total cost to the buyer in purchasing the car. Similarly, the total costs involved in leasing a car includes finance terms, interest rates, length of lease, depreciation methods, tax shields, mileage, inception costs, exit costs and so forth. Each of these parameters affects the total cost to the buyer in leasing the car. Under traditional models, each parameter is calculated by the supplier as negotiated by the buyer. Often, different suppliers use different values for each parameter, and therefore it becomes difficult to compare costs between various suppliers. This problem often precludes quick relative valuations between leasing costs and purchase costs, which is a prerequisite for performing buying versus leasing scenarios in an electronic auction. Furthermore, suppliers supplying bids for a lease typically submit such bids in the form of a monthly lease payment. This is because a buyer typically equates value in terms of costs per monthly basis. Suppliers supplying bids for purchase, however, typically submit bids in the form of a total purchase price. Consequently, in an electronic auction various suppliers may offer bids using different units of value in accordance with the type of program they might be offering. A buyer in an electronic auction would have little, if any, information to perform a meaningful evaluation of the relative costs of each bid from such suppliers.

In accordance with one embodiment, the invention applies the transformation function described with respect to FIGS. 1-6 above to the problem of buying versus leasing comparisons. Although the figures presented herein may include a particular sequence of steps, it can be appreciated that the sequence of steps merely provides an example of how the general functionality described herein can be implemented.

Further, each sequence of steps does not have to be executed in the order presented unless otherwise indicated.

In this embodiment, a first bid having a first value and a first unit of measurement is received. A second bid having a second value and a second unit of measurement is received as well. The first and second values are then transformed to third and fourth values, respectively, having a standard unit of measurement. For example, a standard unit of measurement might be a NPV for each of the total leasing costs and total buy costs, as described in more detail in the '156 Application.

In one embodiment of the invention, the first value is a monthly lease payment and the second value is a purchase price.

In another embodiment of the invention, the first and second values are transformed by determining a first transformation factor for the first value, and a second transformation factor for the second value. The first value is transformed using the first transformation factor, and the second value is transformed using the second transformation factor. In particular, the first value and the second value are transformed via a linear transformation for each value, with the linear transform having a multiplicative adjustment or an additive adjustment. For example, the first value and second value may be transformed by multiplying the first value by the first transformation factor and the second value by the second transformation factor.

The first and second transformation factors may be determined using any number of methods. For example, one method for determining the first and second transformation factors comprises storing the first and second transformation factors in a look-up table using computer memory, searching the look-up table for the first and second transformation factors, and retrieving the first and second transformation factors in accordance with the search.

In this method, the transformation factors for each type of bid are calculated before the start time for a particular lot in an electronic auction. The transformation factors are stored in computer-readable memory in the form of a look-up table. Whenever a bid is received, the system searches the look-up table for the appropriate transformation factor and retrieves the transformation factor from memory. This method avoids the necessity of calculating a transformation factor for each bid during the relatively short time interval that an electronic auction is open. This also reduces the processing requirements and therefore complexity of the overall system.

Another method for determining the first transformation factor includes identifying a first set of transformation variables for the first value, determining a first transformation function to derive the standard unit of measurement using the first value and the first set of transformation variables, receiving a value for each of the first set of transformation variables, and determining the first transformation factor using the received values and the first transformation function. This method permits a transformation factor to be calculated as each bid is received. This may be desirable if the values for the transformation variables, or the transformation variable themselves, are dynamic in nature. In this case a static transformation factor may not be appropriate depending on the level of accuracy required for a particular bidding event.

In one embodiment of the invention, the first set of transformation variables may comprise one or more of a group comprising a tax rate, a depreciation model, a book value life, a cost of debt, a cost of capital, risk factors based on different leasing plans, inception costs, exit costs and so forth.

Similarly, a method for determining the second transformation factor includes identifying a second set of transformation variables for the second value, determining a second transformation function to derive the standard unit of measurement using the second value and the second set of transformation variables, receiving a value for each of the second set of transformation variables, and determining the second transformation factor using the received values and the second transformation function. The second set of transformation variables may comprise one or more of a group comprising a tax rate, a depreciation model, a book value life, a cost of debt, a cost of capital, inception costs and exit costs.

It is worthy to note that any number or type of transformation variables can be used for a desired transformation function and still fall within the scope of the invention. Furthermore, the transformation functions described with respect to this embodiment may be implemented using the generic transformation 500 described with respect to FIG. 5.

In one embodiment of the invention, the standard unit of measurement is a buyer comparative bid parameter. In particular, the buyer comparative bid parameter represents a net present value.

Once the different bids are normalized using a standard unit of measurement, the third and fourth values are compared. The third value is then ranked with respect to the fourth value in accordance with the comparison. This relative ranking is then displayed to the buyer.

Not only is it important for the buyer to have bids with different units of measure transformed to a standard or uniform unit of measure, it is important for the sellers (i.e., bidders) to understand where their bid stands in relation to the other sellers. This need, however, must be balanced against the need of the buyer to keep certain information from the sellers to ensure a particular seller does not have a bidding advantage. Therefore, one embodiment of the invention allows for bids having a different unit of measure than used by one particular bidder to be converted to a unit of measure used by that particular bidder. Using the above methods, assume the first bid is from a first bidder and the second bid is from a second bidder. The third value (e.g., representing the transformed first value submitted by the first bidder) is detransformed to a fifth value having the second unit of measurement. Similarly, the fourth value (e.g., representing the transformed second value submitted by the second bidder) is detransformed to a sixth value having the first unit of measurement. The fifth value is then sent to the second bidder so that the second bidder can know where their bid ranks with respect to other bids, even if the other bids use a different unit of measurement. The sixth value is sent to the first bidder for the same reasons. In other words, the bids from other bidders using a different unit of measurement are converted to the unit of measurement used by a particular bidder so that the particular bidder is made aware of where its bid ranks relative to the other bids. The detransformation process may be implemented using transformation 800 and its appropriate mathematical and functional variations, as well as the process described with respect to FIGS. 6A-6C.

Figure 4:
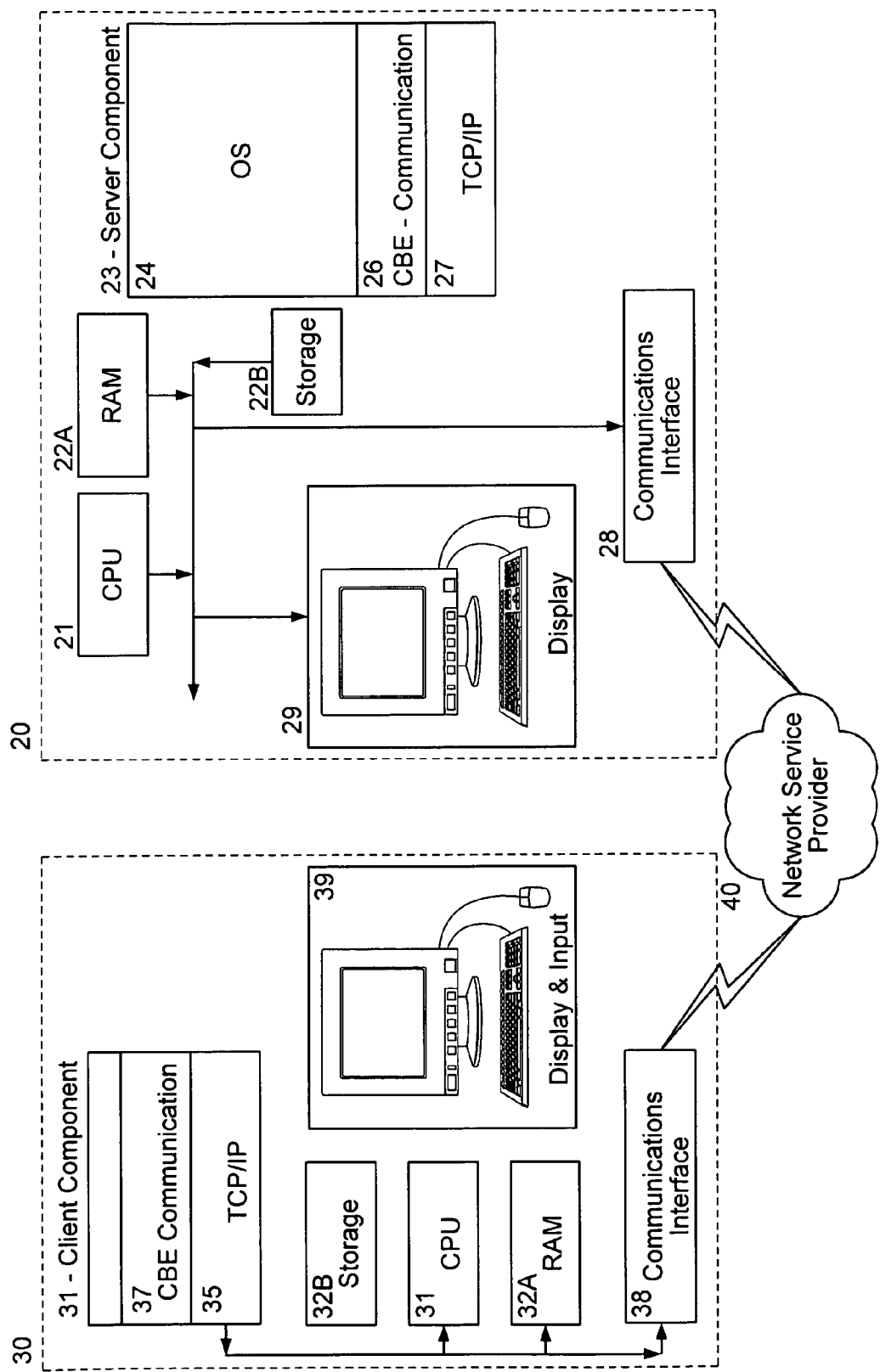
FIG. 4 illustrates the client and server components of the computer software application that conducts the auction and the hardware at the sites of the coordinator and the potential suppliers on which the client and server components operate.

As described previously, the embodiments of the invention may be implemented by a processor-based computer system. With reference to FIG. 4, a computer system 20 operates to execute the functionality for server component 23. Computer system 20 includes a processor 21, a memory 22A and a disk storage 22B. Memory 22A stores computer program instructions and data. Processor 21 executes the program instructions, and processes the data, stored in memory 22A. Disk storage 22B stores data to be transferred to and from memory 22A. All these elements are interconnected by one or more buses, which allows data to be intercommunicated between the elements.

Processor 21 can be any type of processor capable of providing the speed and functionality required by the embodiments of the invention. For example, processor 21 could be a processor from a family of processors made by Intel Corporation or Motorola.

For purposes of this application, memory 22A and disk 22B are machine readable mediums and could include any medium capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk (e.g., floppy disk and hard drive), optical disk (e.g., CD-ROM), optical fiber, electrical signals, lightwave signals, radio-frequency (RF) signals and any other device or signal that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor. Further, system 20 may contain various combinations of machine readable storage devices, which are accessible by processor 21 and which are capable of storing a combination of computer program instructions and data.

Memory 22A is accessible by processor 21 over a bus and includes an operating system, a program partition and a data partition. The program partition stores and allows execution by processor 21 of program instructions that implement the functions of each respective system described herein. The data partition is accessible by processor 21 and stores data used during the execution of program instructions. For some embodiments of the invention, the program partition contains program instructions that performs the buy versus leasing transformation functionality described above.

Computer system 20 also includes a network interface 28. Network interface 28 may be any suitable means for controlling communication signals between network devices using a desired set of communications protocols, services and operating procedures. Communication protocols are layered, which is also referred to as a protocol stack, as represented by an operating system 24, a CBE-communication layer 26, and a Transport Control Protocol/Internet Protocol (TCP/IP) layer 27. Network interface 28 also includes connectors for connecting interface 28 with a suitable communications medium. Those skilled in the art will understand that network interface 28 may receive communication signals over any suitable medium such as twisted-pair wire, co-axial cable, fiber optics, radio-frequencies, and so forth.

FIG. 4 also shows a computer system 30 that operates to execute the functionality for client component 31. Computer system 30 includes a processor 31, a memory 32A, disk storage 32B, a communications interface 38, and a protocol stack having a CBE-communication layer 37 and a TCP/IP layer 35. These elements operate in a manner similar to the corresponding elements for computer system 20.

While the embodiments of the invention have been described in detail and with reference to specific embodiments thereof, it will be apparent to one skilled in the art that various changes and modifications can be made therein without departing from the spirit and scope thereof. In particular, it should be noted that while the auction functions described above have been described in the context of downward pricing auctions, the auction functions can be equally applied to upward pricing auctions. Thus, it is intended that the embodiments of the invention cover the modifications and variations thereto provided they come within the scope of the appended claims and their equivalents. For example, although the embodiments of the invention implement the functionality of the processes described herein in software, it can be appreciated that the functionality of these processes may be implemented in hardware, software, or a combination of hardware and software, using well-known signal processing techniques. In another example, the embodiments were described using a communication network. A communication network, however, can utilize an infinite number of network devices configured in an infinite number of ways. The communication network described herein is merely used by way of example, and is not meant to limit the scope of the invention.

The invention claimed is:

1. A computer implemented method to transform bids in an electronic auction, comprising:

receiving electronically at a server a request from a buyer over a network, the request describing an item that a buyer wishes to buy through straight purchase or monthly lease;

presenting the requested item to a plurality of sellers supplying a plurality of items including the requested item, the plurality of sellers being potential seller bidders for bidding the requested item;

receiving a first bid having a first value and a first unit of measurement from a first seller bidder over the network, the first seller bidder being one of the plurality of the seller bidders, wherein the first value represents at least a monthly lease payment for leasing the requested item;

receiving a second bid having a second value and a second unit of measurement from a second seller bidder different than the first seller bidder over the network, the second seller bidder being one of the plurality of the seller bidders, wherein the second value represents at least a straight purchase price for purchasing the requested item;

determining a first transformation function for the first value, wherein the first transformation function is only known to the buyer;

determining a first set of non-comparative bid parameters for the first transformation function;

determining a second transformation function for the second value, wherein the second transformation function is only known to the buyer;

determining a second set of non-comparative parameters for the second transformation function;

transforming said first and second values to third and fourth values based on the first transformation function with the first set of non-comparative bid parameters and the second transformation function with the second set of non-comparative bid parameters, respectively, having a standard unit of measurement, wherein third value represents a total payment for leasing the requested item over a predetermined period of time, wherein the fourth value represents a total payment for the straight purchase of the requested item; and presenting the third value and the fourth value to the buyer over the network such that the buyer is able to compare total costs of leasing or purchasing the requested item in order to make a decision on whether the requested item should be purchased or leased.

2. The method of claim 1, wherein the first transformation function determines a first transformation factor for the first value, wherein the first transformation function transforms the first value using the first transformation factor, wherein the second transformation function determines a second transformation factor for the second value, and wherein the second transformation function transforms the second value using the second transformation factor.

3. The method of claim 1, wherein transforming said first value and said second value comprises performing a linear transformation for each value having at least one of a multiplicative adjustment and an additive adjustment.

4. The method of claim 2, wherein transforming said first value and said second value comprises multiplying said first value by said first transformation factor and said second value by said second transformation factor.

5. The method of claim 2, wherein determining said first and second transformation factors comprises:
   searching a look-up table for said first and second transformation factors; and
   retrieving said first and second transformation factors in accordance with said search.

6. The method of claim 2, wherein determining said first set of non-comparative bid parameters comprises:
   identifying a first set of transformation variables for said first value; and
   receiving a value for each of said first set of transformation variables;
   wherein the first transformation function derives said standard unit of measurement using said first value and said first set of transformation variables.

7. The method of claim 6, wherein said first set of transformation variables comprise at least one of a group comprising a tax rate, a depreciation model, a book value life, a cost of debt, a cost of capital, risk factors based on different leasing plans, inception costs and exit costs.

8. The method of claim 2, wherein determining said second set of non-comparative bid parameters comprises:
   identifying a second set of transformation variables for said second value; and
   receiving a value for each of said second set of transformation variables;
   wherein the second transformation function derives said second transformation factor using said received values and said second set of transformation variables.

9. The method of claim 8, wherein said second set of transformation variables comprise at least one of a group comprising a tax rate, a depreciation model, a book value life, a cost of debt, a cost of capital, inception costs and exit costs.

10. The method of claim 1, wherein said standard unit of measurement is a buyer comparative bid parameter.

11. The method of claim 10, wherein said buyer comparative bid parameter represents a net present value.

12. The method of claim 1, further comprising:
    comparing said third value and said fourth value; and
    ranking said third value with respect to said fourth value in accordance with said comparison.

13. The method of claim 12, further comprising displaying said rankings for a buyer.

14. The method of claim 1, wherein said first bid is from a first bidder and said second bid is from a second bidder, and further comprising:
    detransforming said third value to a fifth value having said second unit of measurement, and said fourth value to a sixth value having said first unit of measurement; and
    sending said fifth value to said second bidder and said sixth value to said first bidder.

15. A machine-readable medium whose contents cause a computer system to perform a method to transform bids in an electronic auction, the method comprising:
    receiving electronically at a server a request from a buyer over a network, the request describing an item that a buyer wishes to buy through straight purchase or monthly lease;
    presenting the requested item to a plurality of seller supplying a plurality of items including the requested item, the plurality of sellers being potential seller bidders for bidding the requested item;
    receiving a first bid having a first value and a first unit of measurement from a first seller bidder over the network, the first seller bidder being one of the plurality of the seller bidders, wherein the first value represents at least a monthly lease payment for leasing the requested item;
    receiving a second bid having a second value and a second unit of measurement from a second seller bidder different than the first seller bidder over the network, the second seller bidder being one of the plurality of the seller bidders, wherein the second value represents at least a straight purchase price for purchasing the requested item;
    determining a first transformation function for the first value, wherein the first transformation function is only known to the buyer;
    determining a first set of non-comparative bid parameters for the first transformation function;
    determining a second transformation function for the second value, wherein the second transformation function is only known to the buyer;
    determining a second set of non-comparative parameters for the second transformation function;
    transforming said first and second values to third and fourth values based on the first transformation function with the first set of non-comparative bid parameters and the second transformation function with the second set of non-comparative bid parameters, respectively, having a standard unit of measurement, wherein third value represents a total payment for leasing the requested item over a predetermined period of time, wherein the fourth value represents a total payment for the straight purchase of the requested item; and
    presenting the third value and the fourth value to the buyer over the network such that the buyer is able to compare total costs of leasing or purchasing the requested item in order to make a decision on whether the requested item should be purchased or leased.

16. The machine-readable medium of claim 15, wherein the first transformation function determines a first transformation factor for the first value, wherein the first transformation function transforms the first value using the first transformation factor, wherein the second transformation function determines a second transformation factor for the second value, and wherein the second transformation function transforms the second value using the second transformation factor.

17. The machine-readable medium of claim 15, wherein transforming said first value and said second value comprises performing a linear transformation for each value having at least one of a multiplicative adjustment and an additive adjustment.

18. The machine-readable medium of claim 16, wherein transforming said first value and said second value comprises multiplying said first value by said first transformation factor and said second value by said second transformation factor.

19. The machine-readable medium of claim 16, wherein determining said first and second transformation factors comprises:

searching a look-up table for said first and second transformation factors; and retrieving said first and second transformation factors in accordance with said search.

20. The machine-readable medium of claim 16, wherein determining said first set of non-comparative bid parameters comprises:
identifying a first set of transformation variables for said first value; and
receiving a value for each of said first set of transformation variables;
wherein the first transformation function derives said standard unit of measurement using said first value and said first set of transformation variables.

21. The machine-readable medium of claim 20, wherein said first set of transformation variables comprise at least one of a group comprising a tax rate, a depreciation model, a book value life, a cost of debt, a cost of capital, risk factors based on different leasing plans, inception costs and exit costs.

22. The machine-readable medium of claim 16, wherein determining said second set of non-comparative bid parameters comprises:
identifying a second set of transformation variables for said second value; and
receiving a value for each of said second set of transformation variables;
wherein the second transformation function derives determining said second transformation factor using said received values and said second set of transformation variables.

23. The machine-readable medium of claim 22, wherein said second set of transformation variables comprise at least one of a group comprising a tax rate, a depreciation model, a book value life, a cost of debt, a cost of capital, inception costs and exit costs.

24. The machine-readable medium of claim 15, wherein said standard unit of measurement is a buyer comparative bid parameter.

25. The machine-readable medium of claim 24, wherein said buyer comparative bid parameter represents a net present value.

26. The machine-readable medium of claim 15, further comprising:
comparing said third value and said fourth value; and
ranking said third value with respect to said fourth value in accordance with said comparison.

27. The machine-readable medium of claim 26, further comprising displaying said rankings for a buyer.

28. The machine-readable medium of claim 15, wherein said first bid is from a first bidder and said second bid is from a second bidder, and further comprising:
detransforming said third value to a fifth value having said second unit of measurement, and said fourth value to a sixth value having said first unit of measurement; and
sending said fifth value to said second bidder and said sixth value to said first bidder.

29. A data processing system, comprising:
a processor; and
a memory coupled to the processor for storing instructions, when executed from the memory, cause the processor to perform a method for online auction, the method including:
receiving electronically at a server a request from a buyer over a network, the request describing an item that a buyer wishes to buy through straight purchase or monthly lease;
presenting the requested item to a plurality of seller supplying a plurality of items including the requested item, the plurality of sellers being potential seller bidders for bidding the requested item;
receiving a first bid having a first value and a first unit of measurement from a first seller bidder over the network, the first seller bidder being one of the plurality of the seller bidders, wherein the first value represents at least a monthly lease payment for leasing the requested item;
receiving a second bid having a second value and a second unit of measurement from a second seller bidder different than the first seller bidder over the network, the second seller bidder being one of the plurality of the seller bidders, wherein the second value represents at least a straight purchase price for purchasing the requested item;
determining a first transformation function for the first value, wherein the first transformation function is only known to the buyer;
determining a first set of non-comparative bid parameters for the first transformation function;
determining a second transformation function for the second value, wherein the second transformation function is only known to the buyer;
determining a second set of non-comparative bid parameters for the second transformation function;
transforming said first and second values to third and fourth values based on the first transformation function with the first set of non-comparative bid parameters and the second transformation function with the second set of non-comparative bid parameters, respectively, having a standard unit of measurement, wherein third value represents a total payment for leasing the requested item over a predetermined period of time, wherein the fourth value represents a total payment for the straight purchase of the requested item; and
presenting the third value and the fourth value to the buyer over the network such that the buyer is able to compare total costs of leasing or purchasing the requested item in order to make a decision on whether the requested item should be purchased or leased.

* * * * *